US007685465B1

(12) United States Patent
Shaw et al.

(10) Patent No.: US 7,685,465 B1
(45) Date of Patent: Mar. 23, 2010

(54) HIGH-AVAILABILITY DATA CENTER

(75) Inventors: John Christopher Shaw, San Antonio, TX (US); Patrick Wayne Price, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 332 days.

(21) Appl. No.: 11/533,248

(22) Filed: Sep. 19, 2006

(51) Int. Cl.
G06F 11/00 (2006.01)

(52) U.S. Cl. .............................. 714/15; 714/4; 709/239

(58) Field of Classification Search ........................ None
See application file for complete search history.

(56) References Cited

U.S. PATENT DOCUMENTS

| | | | | |
|---|---|---|---|---|
| 6,134,673 | A * | 10/2000 | Chrabaszcz | 714/13 |
| 6,185,695 | B1 * | 2/2001 | Murphy et al. | 714/4 |
| 6,694,447 | B1 * | 2/2004 | Leach et al. | 714/6 |
| 6,728,896 | B1 * | 4/2004 | Forbes et al. | 714/4 |
| 6,760,861 | B2 * | 7/2004 | Fukuhara et al. | 714/4 |
| 6,816,980 | B1 * | 11/2004 | Fukuhara et al. | 714/4 |
| 6,944,788 | B2 * | 9/2005 | Dinker et al. | 714/4 |
| 7,127,638 | B1 * | 10/2006 | Sardella et al. | 714/15 |
| 7,434,087 | B1 * | 10/2008 | Singh | 714/4 |
| 2002/0042818 | A1 * | 4/2002 | Helmer et al. | 709/217 |
| 2003/0014526 | A1 * | 1/2003 | Pullara et al. | 709/227 |
| 2006/0036895 | A1 * | 2/2006 | Henrickson | 714/4 |
| 2006/0193247 | A1 | 8/2006 | Naseh et al. | |
| 2006/0193252 | A1 | 8/2006 | Naseh et al. | |
| 2006/0195607 | A1 | 8/2006 | Naseh et al. | |
| 2006/0230122 | A1 * | 10/2006 | Sutou et al. | 709/219 |
| 2006/0259815 | A1 * | 11/2006 | Graham et al. | 714/11 |
| 2007/0006015 | A1 * | 1/2007 | Rao et al. | 714/4 |
| 2007/0168690 | A1 * | 7/2007 | Ross | 714/4 |
| 2008/0140844 | A1 * | 6/2008 | Halpern | 709/226 |
| 2009/0217083 | A1 * | 8/2009 | Hatasaki et al. | 714/4 |

OTHER PUBLICATIONS

IBM, "System Automation for z/OS; Planning and Installation," Version 2, Release 3, Twelfth Edition (Nov. 2004) [online], Copyright International Business Machines Corporation 1996, 2004, [retrieved on Feb. 12, 2007] pp. 1-249. Retrieved from the Internet: s390id@de.ibm.com. [IBM Deuschland Entwicklung GmbH].

(Continued)

Primary Examiner—Christopher S McCarthy
(74) Attorney, Agent, or Firm—Brooks, Cameron & Huebsch, PLLC

(57) ABSTRACT

Method/system is disclosed for recovering computing capacity and critical applications after a catastrophic failure. The method/system involves distributing the computing capacity over multiple computing clusters, each computing cluster having concurrent access to shared data and software applications of other computing clusters. Sufficient backup computing capacity is reserved on each computing cluster to recover some or all active computing capacity on the other computing clusters. Message traffic throughout the computing clusters is monitored for indications of a catastrophic failure. Upon confirmation of a catastrophic failure at one computing cluster, the workloads of that computing cluster are transferred to the backup computing capacity of the other computing clusters. Software applications that have been designated for recovery are then brought up on the backup computing capacity of the other computing clusters. Such an arrangement allows computing capacity and critical software applications to be quickly recovered after a catastrophic failure.

21 Claims, 6 Drawing Sheets

OTHER PUBLICATIONS

IBM, "International Information Bulletin for Customers—Capacity On Demand Offerings," [online], Dec. 31, 2004 [retrieved Feb. 12, 2007], pp. 1-8. Retrieved from the Internet: International Business Machines Bulletin No. GM13-0696-00 Feb. 2005.

IBM, "System z9 and eServer zSeries Capacity on Demand User's Guide," [online] Copyright IBM Corporation 2005, Armonk, NY U.S.A. [retrieved Feb. 12, 2007] pp. 1-9. Retrieved from the Internet: International Business Machines Bulletin No. GM13-0716-00 [ZSWO1604-USEN-03].

IBM, "IBM GDPS business continuity solutions," [online] Copyright IBM Corporation 2004, Somers, NY U.S.A. [retrieved Feb. 12, 2007] pp. 1-2. Retrieved from the Internet: International Business Machines Bulletin No. G510-5050-02.

Loveland, S., Miller, G., Prewitt, R., Shannon, M., "Testing z/OS: The premier operating system for IBM's zSeries server," [online] Copyright 2002 [retrieved Feb. 12, 2007] pp. 55-76. Retrieved from the Internet: IBM Systems Journal, vol. 41, No. 1, 2002.

IBM, "IBM Trivoli SA z/OS: Technical Resources—High-availability solution for WebSphere Application Server for z/OS and OS/390," [online] Sep. 14, 2006. [retrieved Feb. 12, 2007] p. 1. Retrieved from the Internet: <URL: http://www.03.ibm.com/servers/eserver/zseries/software/sa/techresources/washa.html>.

IBM, "An Automation and High Availability Solution for WebSphere Application Server for OS/390 and z/OS Based on System Automation for OS/390," [online] 2003. [retrieved Feb. 12, 2007] pp. 1-61. Retrieved from the Internet: "System Automation Development, IBM Boeblingen—Mar. 2003."

IBM, "Geographically Dispersed Parallel Sysplex (GDPS®)—IBM eServer System z," [online] Sep. 14, 2006 [retrieved Feb. 12, 2007]. pp. 1-2. Retrieved from the Internet: <URL: http://www-03.ibm.com/systems/z/gdps/>.

* cited by examiner

HIGH-AVAILABILITY DATA CENTER

CROSS-REFERENCE TO RELATED APPLICATIONS

This application is related to in subject matter, and incorporates herein by reference, co pending U.S. Patent Applications entitled HIGH AVAILABILITY DATA CENTER, U.S. patent application Ser. No. 11/533,262, filed Sep. 19, 2006, and HIGH AVAILABILITY DATA CENTER, U.S. patent application Ser. No. 11/533,272, filed Sep. 19, 2006.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to software applications and particularly to a method and system for automatically recovering such software applications in the event of a system-wide failure.

BACKGROUND

Advances in software programming and computing technology have made increasingly sophisticated and feature-rich software applications available to consumers and businesses alike. For businesses in particular, these powerful software applications provide an ever expanding array of benefits in terms of improved accuracy, efficiency, and convenience for numerous tasks performed on a regular basis. As a result, companies both large and small have come to depend increasingly on these software applications for most aspects of their businesses. Industry indicators predict this trend will likely continue and may even accelerate in the years ahead.

Because of the dependency, companies must keep these software applications continuously available, particularly those applications that are considered to be business-critical software applications. An unplanned outage, even briefly, may have a significant adverse impact on sales, revenue, productivity, and the like. Longer outages may cost the companies in terms of customer loyalty, public perception (i.e., stock price), and may compromise regulatory compliance in highly regulated industries. Consequently, most companies retain a trained technical support group or staff dedicated to setting up and supporting the various software applications used by their organizations.

The technical support staff is also responsible for recovering or bringing the software applications back online in case of a system-wide failure. Such failures are commonly called "catastrophic failures" and refer to situations where most or all of a company's computing capacity is temporarily or permanently wiped out. A catastrophic failure may occur, for example, as a result of a natural disaster (e.g., earthquake, tornado, flood, etc.), but may also be due to human error (e.g., chemical spill, building fire, gas explosion, etc.). More recently, acts of terrorism or sabotage may also cause a catastrophic failure.

To mitigate the impact of catastrophic failures, most companies have an emergency recovery procedure designed to restore at least some computing capacity and, ideally, all critical software applications. In one such recovery procedure, excess computing capacity is reserved offsite at a remote location (e.g., another city, state, region, etc.) and critical applications are brought up at the remote location upon detection of a catastrophic failure. This recovery can take a long time to complete, however, potentially resulting in hours or even days of downtime for some critical applications. At least some of this delay is due to few or none of the critical applications being already up and running at the remote recovery location. In addition, the recoveries have heretofore been largely manual processes, requiring entry of numerous commands on the computing systems at the remote recovery location in order to properly bring the applications back online. More recently, script files have been used to automatically enter the commands required for recovering various software applications. However, these script files must be frequently maintained and updated by the technical support personnel in order to capture the most recent changes in the policies and parameters of the software applications. This frequent maintaining and updating presents a tedious and time-consuming burden on the technical support personnel.

Accordingly, what is needed is a more efficient way to recover computing capacity and critical software applications in the event of a catastrophic failure. In particular, what is needed is a way to automatically detect such a catastrophic failure and quickly initiate procedures for recovering lost computing capacity and critical software applications.

SUMMARY

The disclosed embodiments are directed to a method and a system for recovering computing capacity and critical software applications after a catastrophic failure. The method/system involves distributing the computing capacity over multiple computing clusters, each computing cluster having concurrent access to shared data and software applications of other computing clusters. Sufficient backup computing capacity is reserved on each computing cluster to recover some or all active computing capacity on the other computing clusters. Message traffic throughout the computing clusters is monitored for indications of a catastrophic failure. Upon confirmation of a catastrophic failure at one computing cluster, the workloads of that computing cluster are transferred to the backup computing capacity of the other computing clusters. Software applications that have been designated for recovery are then brought up on the backup computing capacity of the other computing clusters. Such an arrangement allows computing capacity and critical software applications to be quickly recovered after a catastrophic failure.

BRIEF DESCRIPTION OF THE DRAWINGS

The foregoing and other advantages of the invention will become apparent from the following detailed description and upon reference to the drawings, wherein.

DETAILED DESCRIPTION

Following is a detailed description of illustrative embodiments with reference to the drawings wherein the same reference labels are used for the same or similar elements. Throughout this description and the claims, the terms "a" and "an" are intended to mean "one or more."

As alluded to above, existing procedures for recovering computing capacity and critical software applications after a catastrophic failure take an inordinate amount of time and require either manual entry of recovery commands or frequent updates of recovery command scripts. This arrangement places a tremendous burden on technical support personnel and other resources, particularly for software applications where the operating policies and parameters are dynamic and change often. The disclosed embodiments provide a method and system for quickly and automatically, or at least semi-automatically, recovering computing capacity and critical software applications after a catastrophic failure. Such a method/system allows the computing capacity and critical software applications to be available to companies on a continuous or near-continuous basis.

Figure 1:
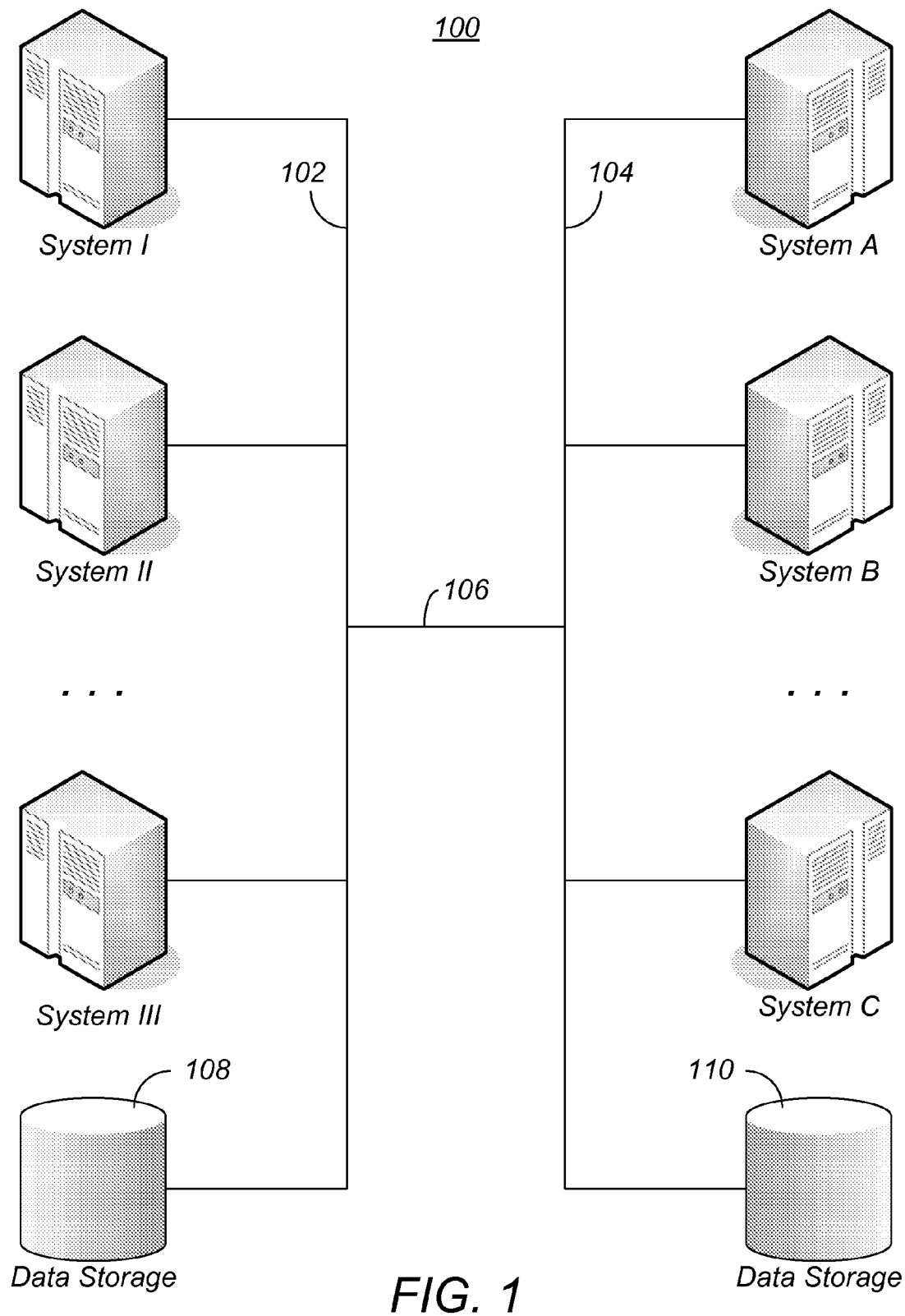
FIG. 1 illustrates an exemplary high-availability data center according to the disclosed embodiments.

Referring now to FIG. 1, an exemplary data center 100 (or portion thereof) according to the disclosed embodiments is shown. The data center 100 is typical of most data centers employed in many companies and organizations insofar as it provides needed computing capacity for various critical and non-critical software applications. Critical software applications are those applications that must be available at all times in order for a company to carry on its day-to-day business. Such critical software applications may include, for example, banking applications, e-commerce applications, accounting applications, inventory tracking applications, and the like. Non-critical applications are those applications that are important, but do not need to be available at all times for the company to carry on its day-to-day business. Examples of non-critical software applications may include word processing applications, appointment scheduling applications, document management applications, and the like.

Unlike typical data centers, however, the data center 100 is a high-availability data center where the computing capacity and the critical software applications running thereon are available on a continuous or near-continuous basis. This means, for example, that the data center 100 is able to quickly and automatically, or at least semi-automatically, recover all or nearly all computing capacity and critical software applications when a catastrophic failure occurs. In addition, the data center 100 is able to automatically detect the catastrophic failure in real time and confirm that the failure has occurred, thereby reducing the time needed to respond to the failure while eliminating most if not all false alarms. In some embodiments, the data center 100 also provides an operator or system administrator with one or more opportunities to override, confirm, or otherwise intervene in the recovery.

To facilitate recovery after a catastrophic failure, in accordance with the disclosed embodiments, the computing capacity of the data center 100 is distributed over several locations. This can be seen in FIG. 1, where a portion of the data center 100 resides at a first computing cluster 102 and another portion resides at a second computing cluster 104. Distributing the computing capacity over several locations in this manner minimizes the possibility of a single catastrophic failure bringing down the entire data center 100. The locations of the computing clusters 102 and 104 are preferably on-site company locations, but may also be off-site locations if needed. In either case, the first computing cluster 102 and the second computing cluster 104 are preferably separated from one another by a sufficient distance (e.g., a quarter mile, half a mile, a mile, etc.) so as to minimize the possibility of one natural or man-made disaster or act of terrorism or sabotage taking down both clusters at the same time, but not so far as to hinder real-time communication between the two computing clusters 102 and 104. A network 106 connects the computing clusters 102 and 104 to one another and to other computing resources internal and external to the company. The network 106 may be any suitable high-speed network commonly used by those skilled in the art for electronic communication and data transfer, including a local area network (LAN), a wide area network (WAN), a private network (intranet), a public network (the Internet), or some combination thereof.

Each computing cluster 102 and 104 may be composed of a plurality of discrete computing nodes or systems interconnected over the network 106. For example, the first computing cluster 102 may be composed of computing system I, computing system II, and computing system III, and the second computing cluster 104 may be composed of computing system A, computing system B, and computing system C. The computing systems I-III and A-C may be any suitable computing systems known to those having ordinary skill in the art, but are preferably mainframe and/or server based computing systems. Also present are mirrored data storage units 108 and 110 for storing data and software applications used in each computing cluster 102 and 104, respectively. Note that only two computing clusters and three computing systems for each cluster are shown here in order to avoid unnecessarily cluttering the drawings. However, those having ordinary skill in the art will recognize that there may be more computing clusters and fewer or more computing systems for each cluster, as needed.

Although the computing systems I-III and A-C are distributed over several computing clusters 102 and 104, functionally, they operate as a single computing system. This arrangement is commonly referred to as a "sysplex" for its resemblance to a single system distributed over an entire complex. Examples of commercially available sysplex include zSeries™ mainframe sysplex from International Business Machines (IBM) Corp. Such sysplex technology from IBM provides a number of advantages, including direct and concurrent access to each computing system's data by all computing systems I-III and A-C in the data center 100. As a result, tasks like e-commerce transactions or database queries that were originally initiated on one computing system I-III or A-C may be dynamically reallocated to a different computing system I-III or A-C, or distributed for parallel execution on several computing systems I-III and A-C, depending on available computing capacity.

Figure 2A:
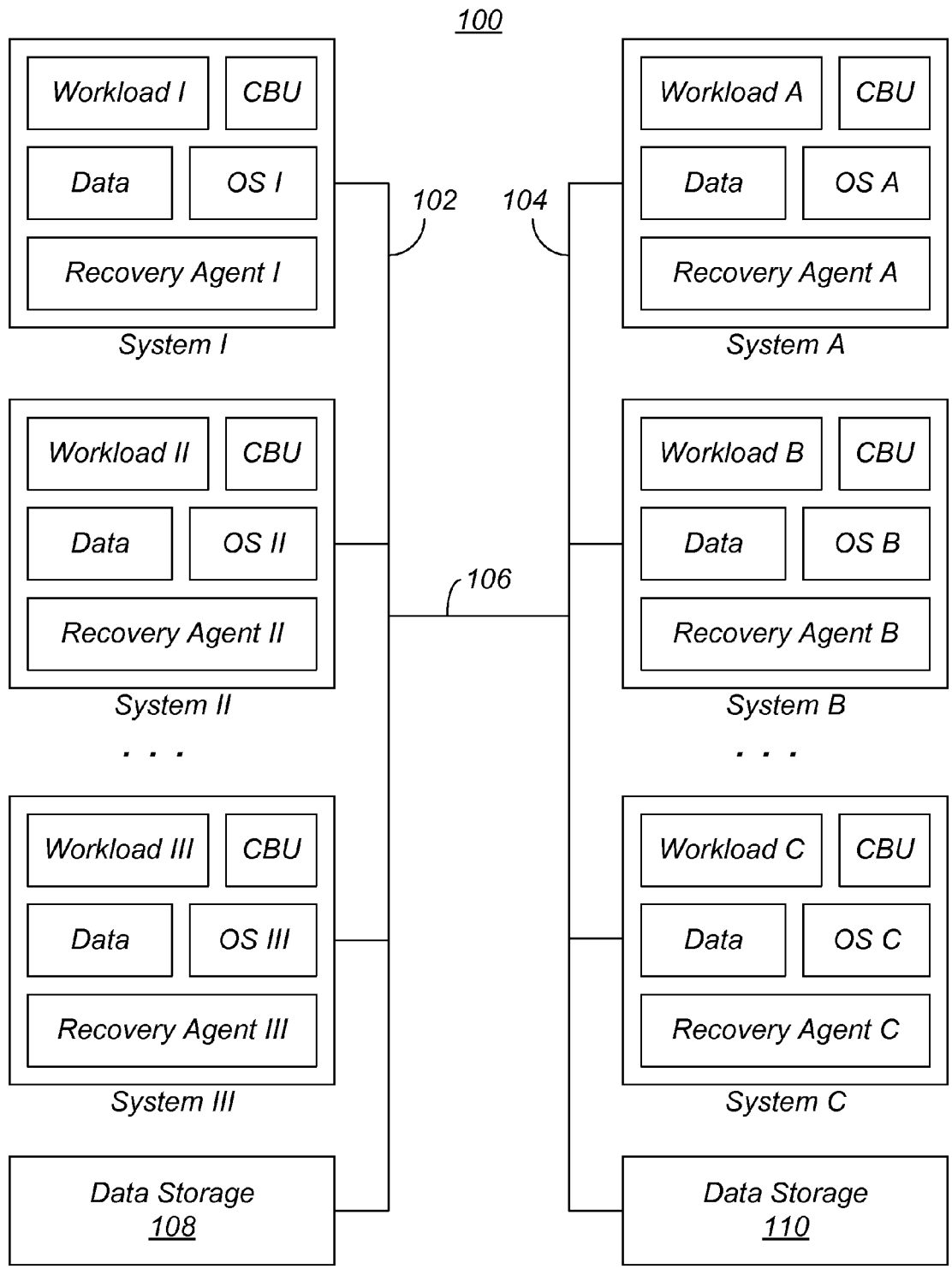
FIGS. 2a-2c illustrate components of the high-availability data center according to the disclosed embodiments.
Figure 2B:
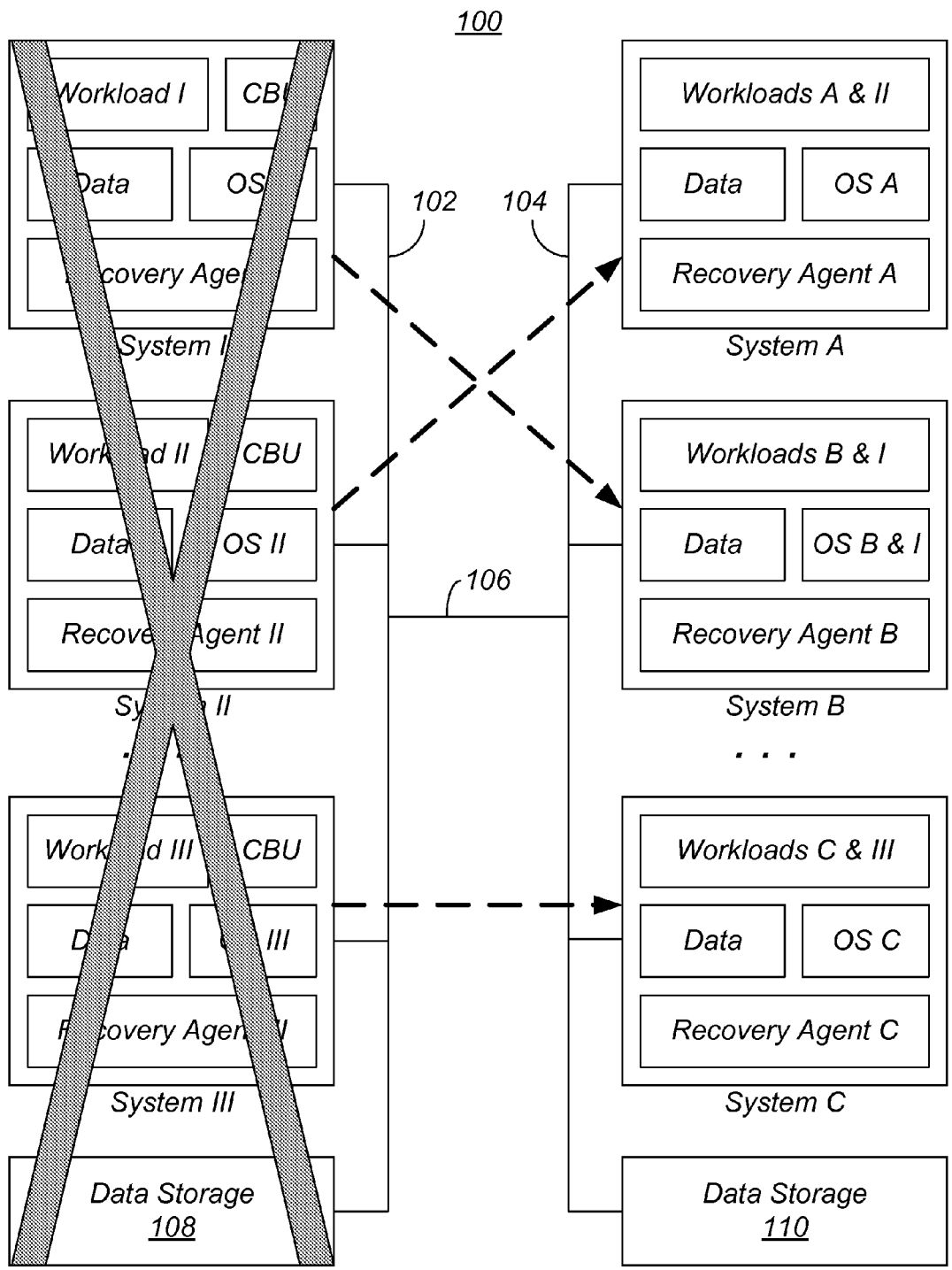
Figure 2C:
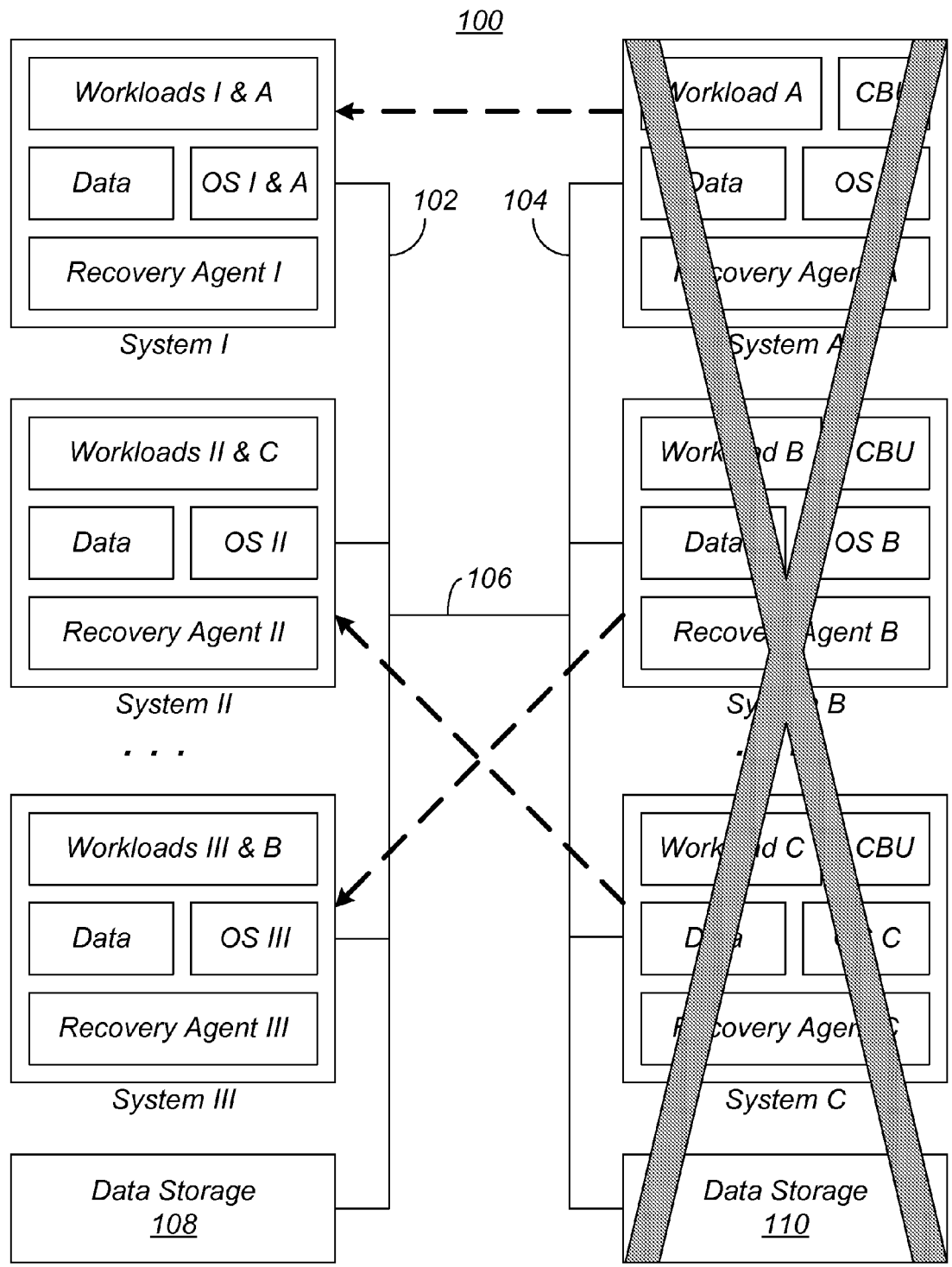

FIGS. 2a-2c illustrate the computing systems I-III and A-C of the data center 100 in more detail according to the disclosed embodiments. Referring first to FIG. 2a, each computing system I-III and A-C in the first and second computing clusters 102 and 104 has a certain amount of computing capacity available for workload processing. The workloads, labeled as workloads I-III and A-C, may include executing one or more software applications and the various computing tasks associated therewith, such as running database queries, performing numerical calculations, and other similar computing tasks. The exact composition of each workload I-III and A-C typically vary from system to system, but there may be some overlap depending on which software applications and computing tasks are required. To manage the workloads, each computing system I-III and A-C usually has an operating system (OS) running thereon, labeled here as OS I-III and A-C, that handles the allocation of computing capacity and other resources to the workloads. Also present is data for the software applications and computing tasks, which data may be cached locally on each computing system I-III and A-C. Recall that the data on each computing system I-III and A-C may be accessed by other computing systems I-III and A-C in the data center 100.

In accordance with the disclosed embodiments, each computing system I-III and A-C has a certain amount of reserved computing capacity, called capacity backup units (CBU). The capacity backup units are essentially surplus computing capacity (e.g., additional processors) within each computing system I-III and A-C. Examples of such capacity backup units include zSeries™ mainframe capacity backup units commercially available from IBM. Each computing system I-III and A-C may contain the same number of capacity backup units, or some systems may have more capacity backup units, depending on the needs of the data center 100. In a preferred embodiment, sufficient capacity backup units are provided in the computing systems I-III of the first computing cluster 102 to support all of the computing capacity of the computing systems A-C in the second computing cluster of 104, and vice versa. These capacity backup units are usually dormant for normal workload processing and are activated only in emergencies (e.g., a catastrophic failure) to help ensure continued availability of critical software applications.

When a catastrophic failure occurs on one of the computing clusters 102 or 104, the workloads of the computing systems I-III or A-C that are lost are recovered on the capacity backup units of the remaining systems. Thus, for example, when a catastrophic failure occurs on the first computing cluster 102, the workloads of the computing systems I-III are recovered on the capacity backup units of the second computing cluster 104. Likewise, when a catastrophic failure occurs on the second computing cluster 104, the workloads of the computing systems A-C are recovered on the capacity backup units of the first computing cluster 102. For purposes of this description, a catastrophic failure refers to a failure in which the computing capacity of either the first computing cluster 102 or the second computing cluster 104 is completely wiped out.

Decisions regarding which particular workloads I-III and A-C that are recovered on which particular computing systems I-III and A-C may vary. In some embodiments, the decision regarding which workloads I-III and A-C to recover and where to recover them is made dynamically by the remaining computing systems I-III and A-C in real time based on the computing capacity available after the catastrophic failure. These embodiments take advantage of the direct and concurrent access that each computing system I-III and A-C has to the data of the other computing systems in the data center 100. This access allows the remaining computing systems I-III and A-C to know or otherwise derive the composition of the lost workloads, thus enabling them to dynamically reallocate the lost workloads to other computing systems, or distribute them across several computing systems for parallel execution, depending on available computing capacity.

In other embodiments, however, a more structured approach may be taken. For example, each computing system I-III in the first computing cluster 102 may be pre-assigned one or more specific computing systems A-C in the second computing cluster 104 to recover, and each computing system A-C in the second computing cluster 104 may be pre-assigned one or more specific computing systems I-III in the first computing cluster 102 to recover. The recovery assignments associated with each computing system I-III and A-C may be general in nature (e.g., recover all critical software applications from the failed computing system), or they may be more specific. For example, each computing system I-III and A-C may include a list or table specifying the particular software applications to recover from its pre-assigned system, the order or sequence in which to recover the applications, and in some cases, whether to recover the operating system of the pre-assigned system. These recovery assignments allow the recovery to proceed in a logical, organized, and predictable manner that also satisfies the operating requirements (if any) of each software application recovered.

In still other embodiments, an intermediate approach may be taken involving some combination of the dynamic approach and the structured approach. For example, the decision as to which failed systems I-III and A-C to recover and where to recover them may still be made dynamically by the remaining systems in real time, as described with respect to the dynamic approach. However, there may be a predefined recovery assignment associated with every computing system I-III and A-C so that once a decision is made as to which remaining system will recover which failed system, the remaining system will carry out the recovery of the failed system according to the recovery assignment established for the failed system, as described with respect to the structured approach above. Such an arrangement would of course require that each computing system I-III and A-C have access to the recovery assignments for all other systems.

In accordance with the disclosed embodiments, the recovery assignments (where applicable) are carried out by automation software called a "recovery agent" executing on each computing system I-III and A-C. The recovery agents, labeled here as recovery agents I-III and A-C, are generally responsible for monitoring the message traffic in the computing systems and detecting when there is a loss of computing capacity. When a loss of computing capacity is detected, preferably one of the recovery agents I-III or A-C in the remaining computing systems is designated as the primary or lead recovery agent. For flexibility purposes, the lead recovery agent may be the first recovery agent I-III or A-C to detect the loss of computing capacity, but the lead recovery agent may also be designated beforehand in each computing cluster 102 and 104 for predictability purposes. In either case, the lead recovery agent functions, among other things, to direct the other recovery agents I-III and A-C to initiate their recovery process, including activating of their capacity backup units.

In operation, the recovery agents I-III in the computing systems of the first computing cluster 102 are responsible for recovering the computing systems A-C in the second computing cluster 104, and the recovery agents A-C in the computing systems of the second computing cluster 104 are responsible for recovering the computing systems I-III in the first computing cluster 102. An example of this can be seen in FIG. 2b, where a recovery is being carried out by the recovery agents A-C using the structured approach discussed above. In this example, the computing systems I-III on the first computing cluster 102 has been lost (indicated by the giant cross). The recovery agents A-C in the computing systems of the second computing cluster 104 detect this lost and initiate a procedure for recovering the workloads of the computing systems I-III. The recovery agents A-C may also confirm the system failure is genuine (i.e., not a false alarm) in some environments before initiating recovery, and may also provide one or more opportunities for a system administrator or operator to override, confirm, or otherwise intervene in the recovery (described further below).

In the particular embodiment shown, each computing system A-C of the second computing cluster 104, or rather the recovery agents therein, has been pre-assigned to recover one of the computing systems I-III of the first computing cluster 102. For example, computing system A has been pre-assigned to recover computing system II, computing system B has been pre-assigned to recover computing system I, and computing system C been pre-assigned to recover computing system III. The assignments are indicated here by dashed lines. Thus, when failure of the computing systems I-III in the first computing cluster 102 is detected and confirmed, each recovery agent A-C already knows exactly which workload I-III in which computing system it is suppose to recover and may automatically begin the recovery process. As mentioned above, the recovery agents A-C may also provide a system administrator or operator with one or more opportunities to override, confirm, or otherwise intervene in the recovery.

To conduct the recovery, each recovery agent A-C may use one or more script files that perform various aspects of the recovery. For example, one or more script files may be used to activate the capacity backup unit upon detection and confirmation of the failure on the computing systems I-III. Each recovery agent A-C may thereafter use one or more script files to launch or otherwise start up the software applications associated with its pre-assigned workload I-III on the capacity backup unit. These software applications, as well as information regarding their most current configurations and parameters (i.e., "policy objects" in zSeries terminology), are stored in, and may be subsequently retrieved from, the mirrored data storage unit 110 of the second computing cluster 104. Consequently, the capacity backup units for the computing systems A-C are no longer shown in FIG. 2b, as they have now been activated and are handling part of the workloads for those systems. As a result, computing system A is now handling its own workload as well as part or all of the workload for computing system II, computing system B is now handling its own workload as well as part or all of the workload for computing system I, and computing system C is now handling its own workload as well as part or all of the workload for computing system III.

In some embodiments, recovery involves recovering all or as many software applications running on the failed computing systems as possible. In other embodiments, however, certain software applications on the failed computing system, for example, non-critical software applications, are deliberately not recovered for various reasons. In accordance with these embodiments, each computing system I-III and A-C may have a recovery list associated therewith that identifies which software applications are to be recovered and/or which software applications are not to be recovered. Where applicable, the recovery list may also specify the order in which the software applications are to be recovered. The recovery 1st may reside on the pre-assigned or designated recovery computing system for the failed computing system, or it may reside on another computing system or otherwise be accessible to every computing system I-III and A-C. Alternatively, a single lookup table identifying the software applications to be recovered and/or not to be recovered may be used for all computing system I-III and A-C. Such a table or list allows the recovery procedure to be customized as needed for each computing system to be recovered.

In some embodiments, the recovery list or lookup table may also specify whether the operating systems running on one or more failed computing systems must be recovered. For example, one or more of the software applications to be recovered may require that the operating system also be recovered, or the operating system may need to be recovered as part of a company's internal requirements (e.g., at least three operating systems must be up and running at all times). Therefore, in accordance with the disclosed embodiment, the recovery agents I-III and A-C may also launch or start up one or more operating systems on the capacity backup units. Referring still to FIG. 2b, this can be seen in system B, where the operating system of system I has been brought up and is now running in parallel with system B's own operating system.

FIG. 2c illustrates another exemplary recovery operation according to the disclosed embodiments. The recovery illustrated in FIG. 2c is similar to that illustrated in FIG. 2b except that it is now the computing systems A-C of the second computing cluster 104 that have been lost (as indicated again by the giant cross) and the computing systems I-III of the first computing cluster 102 that are performing the recovery. As such, the principles and teachings described with respect to FIG. 2b are fully applicable to FIG. 2c as well and therefore need not be repeated here. Suffice it to say, upon detecting and confirming the system failures, the recovery agents I-III of the computing systems I-III in the first computing cluster 102 are designed to help recover the lost workloads of the computing systems A-C of the second computing cluster 104 in a manner similar to that discussed above.

Figure 3:
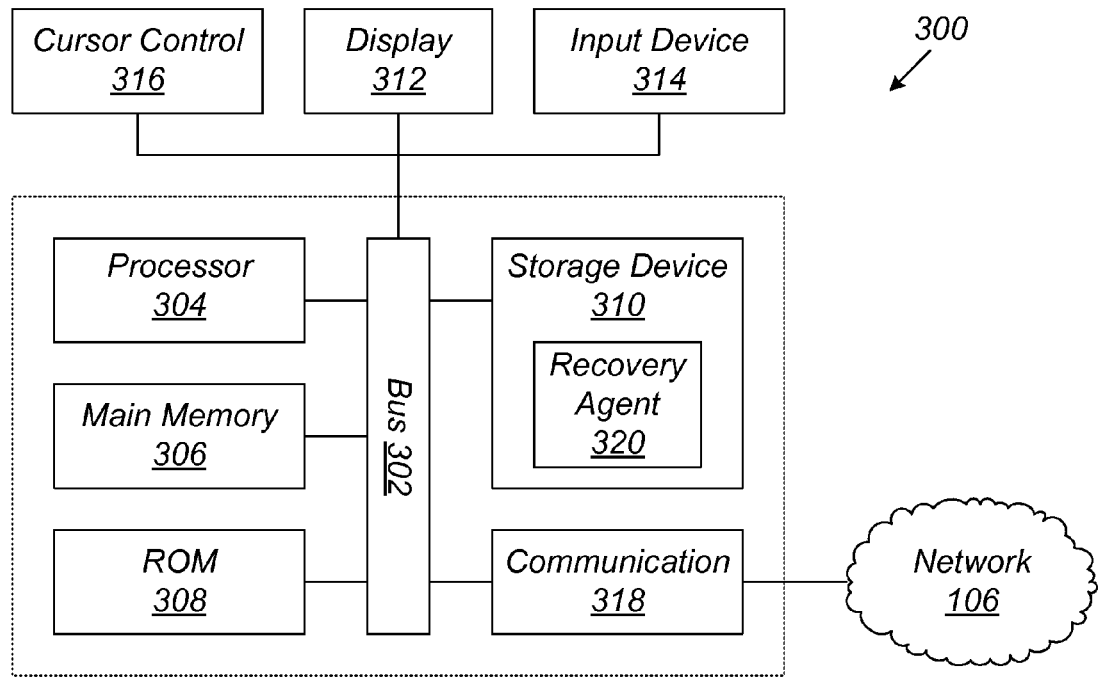
FIG. 3 illustrates an exemplary computing system for a high-availability data center according to the disclosed embodiments.

FIG. 3 illustrates an exemplary computing system 300 like the computing systems I-III and A-C of the computing clusters 102 and 104 (see the data center 100 of FIG. 1). As can be seen, the computing system 300 includes a bus 302 or other communication mechanism for communicating information and a processor 304 coupled with the bus 302 for processing information. The computing system 300 also includes a main memory 306, such as a random access memory (RAM) or other dynamic storage device, coupled to the bus 302 for storing computer-readable instructions to be executed by the processor 304. The main memory 306 also may be used for storing temporary variables or other intermediate information during execution of the instructions to be executed by the processor 304. The computing system 300 further includes a read-only memory (ROM) 308 or other static storage device coupled to the bus 302 for storing static information and instructions for the processor 304. A computer-readable storage device 310, such as a magnetic disk or optical disk, is coupled to the bus 302 for storing information and instructions for the processor 304.

The computing system 300 may be coupled via the bus 302 to a display 312, such as a cathode ray tube (CRT), for displaying information to a user. An input device 314, including, for example, alphanumeric and other keys, is coupled to the bus 302 for communicating information and command selections to the processor 304. Another type of user input device is a cursor control 316, such as a mouse, a trackball, or cursor-direction keys for communicating direction information and command selections to the processor 304 and for controlling cursor movement on the display 312. The cursor control 316 typically has two degrees of freedom in two axes, a first axis (e.g., X-axis) and a second axis (e.g., Y-axis), that allow the device to specify positions in a plane.

The term "computer-readable instructions" as used above refers to any instructions that may be performed by the processor 304 and/or other components. Similarly, the term "computer-readable medium" refers to any storage medium that may be used to store the computer-readable instructions. Such a medium may take many forms, including, but not limited to, nonvolatile media, volatile media, and transmission media. Nonvolatile media include, for example, optical or magnetic disks, such as the storage device 310. Volatile media include dynamic memory, such as main memory 306.

Transmission media include coaxial cables, copper wire and fiber optics, including wires of the bus 302. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

Various forms of the computer-readable media may be involved in carrying one or more sequences of one or more instructions to the processor 304 for execution. For example, the instructions may initially be borne on a magnetic disk of a remote computer. The remote computer can load the instructions into its dynamic memory and send the instructions over a telephone line using a modem. A modem local to the computing system 300 can receive the data on the telephone line and use an infrared transmitter to convert the data to an infrared signal. An infrared detector coupled to the bus 302 can receive the data carried in the infrared signal and place the data on the bus 302. The bus 302 carries the data to the main memory 306, from which the processor 304 retrieves and executes the instructions. The instructions received by the main memory 306 may optionally be stored on the storage device 310 either before or after execution by the processor 304.

The computing system 300 also may include a communication interface 318 coupled to the bus 302. The communication interface 318 provides a two-way data communication coupling between the computing system 300 and the network 106. For example, the communication interface 318 may be an integrated services digital network (ISDN) card or a modem used to provide a data communication connection to a corresponding type of telephone line. As another example, the communication interface 318 may be a local area network (LAN) card used to provide a data communication connection to a compatible LAN. Wireless links may also be implemented. In any such implementation, the communication interface 318 sends and receives electrical, electromagnetic, optical, or other signals that carry digital data streams representing various types of information.

In accordance with the disclosed embodiments, a recovery agent 320 may be stored on the computer-readable storage device 310 of the computing system 300. The recovery agent 320 may be automation software that runs on the computing system 300 in conjunction with the operating system thereof. The specific implementation details of such automation software are well known to those having ordinary skill in the art (see, e.g., IBM's zSeries operating system) and need not be described here. In general, the recovery agent 320 facilitates recovery of one or more failed computing systems in a computing cluster of a data center (such as the computing systems I-III and A-C in the computing clusters 102 and 104 of the data center 100, see FIG. 1) after a catastrophic failure. In particular, the recovery agent 320 helps recover the one or more failed computing systems to the host computing system 300 on which the recovery agent 320 resides.

Figure 4:
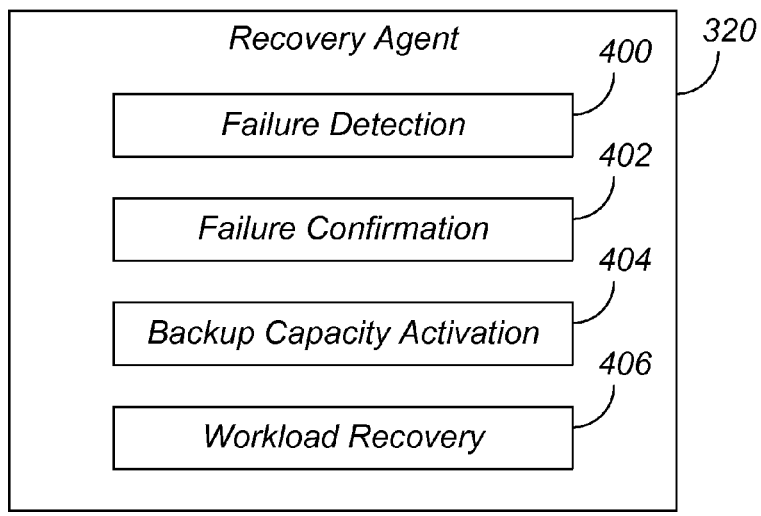
FIG. 4 illustrates an exemplary recovery agent for a high-availability data center according to the disclosed embodiments.

FIG. 4 illustrates the various functions of the recovery agent 320 in more detail. As can be seen, the recovery agent 320 has four main functional components, namely, a failure detection component 400, a failure confirmation component 402, a backup capacity activation component 404 and a workload recovery component 406. Although four functional components are shown here, those having ordinary skill in the art will recognize that one or more functional components may be added to or removed from the recovery agent 320 as needed. Moreover, although a number of discrete components are shown, those having ordinary skill in the art will understand that two or more components may be combined into a single functional component, and that one functional component may be divided into several constituent components, without departing from the scope of the disclosed embodiments.

The failure detection component 400 is responsible for detecting the occurrence of a catastrophic failure in one of the computing clusters of the data center and notifying a system administrator or operator regarding same. In some embodiments, the failure detection component 400 performs its detecting function by monitoring the message traffic between the various computing systems in the data center. Such message traffic typically includes routine messages between the operating systems of the computing systems (e.g., data read/write messages, acknowledgment messages, etc.), but may also include error and/or warning messages. In accordance with the disclosed embodiments, the failure detection component 400 detects the occurrence of a catastrophic failure by checking for the presence of one or more specific error and/or warning messages. These error and/or warning messages may include, for example, messages indicating a failure to read/write data, messages indicating lost data, messages indicating a lack of response, and the like. The detection of such an error and/or warning message by the failure detection component 400 is an indication that a catastrophic failure may be in progress. The failure detection component 400 accordingly informs the failure confirmation component 402 and, in some cases causes a notification message to be sent to the system administrator or operator.

The failure confirmation component 402 is responsible for confirming the occurrence of a catastrophic failure in one of the computing clusters of the data center before initiating procedures for recovering failed computing systems. This helps ensure that the catastrophic failure is a genuine event and not a false alarm resulting from, for example, a scheduled or unscheduled test session, the pressing of a wrong button, or some other user error. In some embodiments, the failure confirmation component 402 performs its confirmation function by delaying a predetermined interval to allow time for the computing systems to correct themselves, for example, in the case of a minor system glitch or malfunction. The failure confirmation component 402 thereafter queries the computing systems in the affected computing cluster to make sure they are still online and responsive. A lack of a response from the queried computing systems is an indication that that an actual catastrophic failure is in progress. The failure confirmation component 402 thereafter informs the backup capacity activation component 404 and, in some cases, causes a notification message to be sent to the system administrator or operator. At this point, the system administrator or operator has an opportunity to override the recovery procedure, for example, if he/she knows that the catastrophic failure is actually a simulation and not a real failure.

The backup capacity activation component 404 is responsible for activating the capacity backup units in the computing system 300 (see FIGS. 2a-2c) upon confirmation that a catastrophic failure is in progress. The activation of the capacity backup units provides the computing system 300 with additional processing capacity for recovering one or more failed computing systems. In some embodiments, the backup capacity activation component 404 performs its activation function by executing one or more script files that turn on the previously dormant capacity backup units. The backup capacity activation component 404 thereafter informs the workload recovery component 406 that the capacity backup units are now available for recovery processing and, in some cases, also causes a notification message to be sent to the system administrator or operator.

The workload recovery component 406 is responsible for recovering one or more software applications on the recently activated capacity backup units, which software applications are associated with the failed computing system or systems that were pre-assigned to be recovered on the computing system 300. Recovering the one or more software applications on the capacity backup units ensures that these software applications are available, thereby minimizing any service interruption that may have resulted from the catastrophic failure. The particular software applications recovered may be all of the software applications running on the one or more failed computing systems, or they may be only certain software applications (e.g., critical software applications). In the latter case, the specific software applications to be recovered may be identified on a predefined list or lookup table along with the sequence (if any) that the software applications are to be recovered, as well as any operating systems that need to be recovered. In some embodiments, the workload recovery component 406 performs its recovery function by launching one or more script files that retrieve and execute the software applications from a mirrored storage unit to which the computing system 300 is connected (see storage units 108 or 110 of FIG. 1). The workload recovery component 406 thereafter notifies or otherwise makes available to the system administrator or operator the various statuses of the recovered software applications.

As can be seen from the foregoing description, the disclosed embodiments provide a way to automatically, or at least semi-automatically, recover lost computing capacity and critical software applications after a catastrophic failure. Following now is a description of the general guidelines, provided in the form a flow chart, that may be used to implement the various disclosed embodiments. It should be noted that, although the method may include a number of discrete steps, those having ordinary skill in the art will recognize that two or more steps may be combined into a single step, and that a single step may be divided into two or more constituents steps, without departing from the disclosed embodiments. In addition, although the method is shown as being performed in one or more sequences, these sequences may be modified as needed without departing from the disclosed embodiments. Moreover, one or more steps may be added to or omitted from these methods without departing from the disclosed embodiments.

Figure 5:
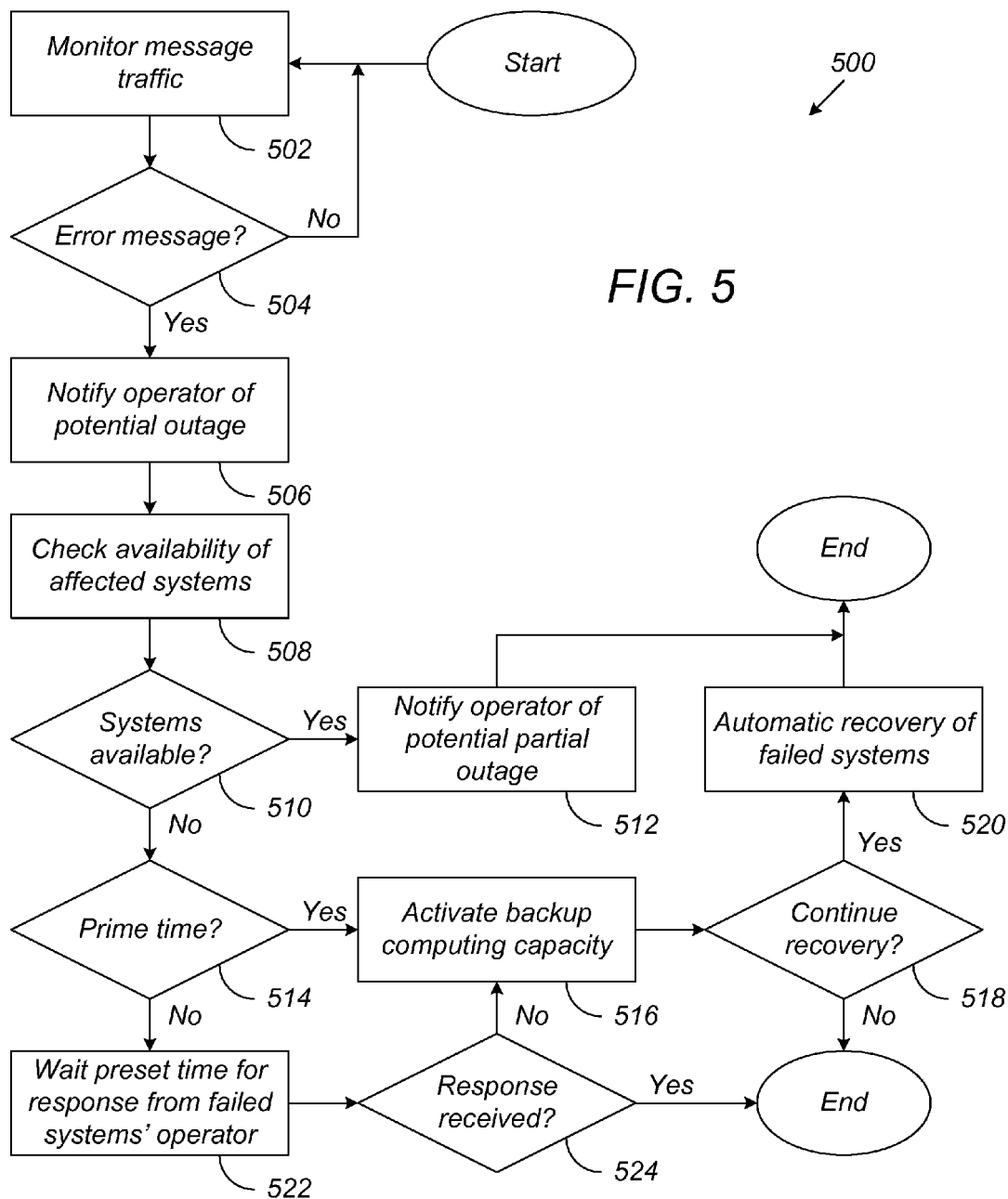
FIG. 5 illustrates an exemplary method for recovering from a catastrophic failure in a high-availability data center according to the disclosed embodiments.

Turning now to FIG. 5, a method 500 for recovering lost computing capacity and critical software applications after a catastrophic failure is shown according to the disclosed embodiments. The method begins at step 502 where monitoring of the message traffic between the various computing systems in the computing clusters of the data center takes place. At step 504, a determination is made as to whether the message traffic contains one or more predefined error and/or warning messages. If the answer to step 504 is no (i.e., no error and/or warning messages), then the method returns to step 502 and continues to monitor the message traffic. On the other hand, if the answer to step 504 is yes (i.e., error and/or warning messages detected), then the method proceeds to notify a system administrator or operator that a catastrophic failure may be in progress at step 506.

At step 508, the method confirms that an actual catastrophic failure is in progress by checking the availability of the computing systems in the affected computing cluster. In some embodiments, the method may delay the system check by a predefined interval (e.g., two minutes) in order to allow time for the computing systems to reset or correct themselves, for example, in case of a minor glitch or malfunction. A determination is made in step 510 as to whether the computing systems in the affected computing clusters are available. In some embodiments, multiple iterations (e.g., two iterations) of this determination may be performed in order to be more sure of the correct answer.

If the answer to step 510 is yes (i.e., at least one computing system is available), then the method proceeds to notify the system administrator or operator at step 512 that at least some of the computing systems in the affected computing cluster are still available (i.e., the failure potentially produced a partial outage). The system administrator or operator may then manually recover any computing systems that may have been lost. On the other hand, if the answer to step 510 is no (i.e., no computing system is available), then the method proceeds to step 514 where a determination is made as to whether the current time is within prime time. In some embodiments, prime time is defined to be from about 6:00 AM to 8:00 PM in the time zone where they data center is located, but other prime time definitions may be used.

If the answer to step 514 is yes (i.e., prime time hours), then the method proceeds to step 516 to activate one or more capacity backup units in the computing systems of the unaffected computing cluster. In some embodiments, the system administrator or operator is given an opportunity at this point to override or allow the recovery to continue. A determination is thereafter made at step 518 as to whether the system administrator or operator has allowed the recovery to continue. If the answer is no (i.e., cancel recovery), then the method is ended. On the other hand, if the answer is yes (i.e., continue recovery), then the method proceeds to step 520 where automatic recovery of the failed computing systems is carried out in the manner described above with respect to FIGS. 2a-2c. The method thereafter notifies or otherwise makes available to the system administrator or operator the various statuses of the recovered software applications, and is subsequently ended.

Referring back to step 514, if the answer is no (i.e., not prime time), then the method proceeds to step 522 where it attempts to obtain a response, within a predetermined amount of time (e.g., 30 minutes), from the system administrator or operator of the computing systems in the affected computing cluster. At step 524, a determination is made as to whether a response has been received from the system administrator or operator. If the answer is no (i.e., affected computing cluster's system administrator or operator not available), then the method assumes that the affected computing cluster is no longer available, at which point the method continues to step 516 in order to activate the one or more capacity backup units. On the other hand, if the answer is yes (i.e., affected computing cluster's system administrator or operator is still available), then the method is ended.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which is set forth in the following claims.

What is claimed is:

1. A method for recovering software applications after a catastrophic failure, said method comprising:

executing a first plurality of software applications on a first computing unit at a first location;

executing a second plurality of software applications on a second computing unit at a second location, wherein the second plurality of software applications are different than the first plurality of software application, said second location remotely located from said first location and said first and second computing units functioning effectively as a single computing unit;

designating said second computing unit for recovery of said first plurality of software applications upon occurrence of said catastrophic failure and a determination that the first computing unit is unresponsive;

dynamically allocating a workload associated with the first computing unit to the second computing unit and at least one other computing unit upon the occurrence of said catastrophic failure, where the at least one other computing unit includes a third plurality of software applications, wherein the second plurality of applications and the third plurality of applications provide a predetermined set of the first plurality of applications; and executing at least one of said first plurality of software applications on said second computing unit in response to a loss of said first computing unit resulting from said catastrophic failure.

2. The method according to claim 1, further comprising:
designating said first computing unit for recovery of said second plurality of software applications upon occurrence of said catastrophic failure; and
executing at least one of said second plurality of software applications on said first computing unit in response to a loss of said second computing unit resulting from said catastrophic failure.

3. The method according to claim 1, wherein said first and said second computing units are one or more of mainframe-based computing units and server-based computing units.

4. The method according to claim 1, wherein said first plurality of software applications include critical and non-critical software applications and said at least one of said first plurality of software applications executed by said second computing unit is a critical software application.

5. The method according to claim 1, wherein said at least one of said first plurality of software applications executed by said second computing unit is specified in a predefined list.

6. The method according to claim 1, further comprising executing said at least one of said first plurality of software applications on said second computing unit according to a predetermined sequence.

7. The method according to claim 1, wherein said first plurality of software applications include an operating system for said first computing unit, further comprising executing said operating system on said second computing unit in response to a loss of said first computing unit resulting from said catastrophic failure.

8. A system for recovering software applications after a catastrophic failure, said system comprising:
at least one subsystem configured to execute a first plurality of software applications on a first computing unit at a first location;
at least one subsystem configured to execute a second plurality of software applications on a second computing unit at a second location, wherein the second plurality of software applications are different than the first plurality of software application, said second location remotely located from said first location and said first and second computing units functioning effectively as a single computing unit;
at least one subsystem configured to designate said second computing unit for recovery of said first plurality of software applications upon occurrence of said catastrophic failure and a determination that the first computing unit is unresponsive;
at least one subsystem to dynamically allocate a workload associated with the first computing unit to the second computing unit and at least one other computing unit upon the occurrence of said catastrophic failure, where the at least one other computing unit includes a third plurality of software applications, wherein the second plurality of applications and the third plurality of applications provide a predetermined set of the first plurality of applications; and
at least one subsystem configured to execute at least one of said first plurality of software applications on said second computing unit in response to a loss of said first computing unit resulting from said catastrophic failure.

9. The system according to claim 8, further comprising:
at least one subsystem configured to designate said first computing unit for recovery of said second plurality of software applications upon occurrence of said catastrophic failure; and
at least one subsystem configured to execute at least one of said second plurality of software applications on said first computing unit in response to a loss of said second computing unit resulting from said catastrophic failure.

10. The system according to claim 8, wherein said first and said second computing units are one or more of mainframe-based computing units and server-based computing units.

11. The system according to claim 8, wherein said first plurality of software applications include critical and non-critical software applications and said at least one of said first plurality of software applications executed by said second computing unit is a critical software application.

12. The system according to claim 8, wherein said at least one of said first plurality of software applications executed by said second computing unit is specified in a predefined list.

13. The system according to claim 8, further comprising at least one subsystem configured to execute said at least one of said first plurality of software applications on said second computing unit according to a predetermined sequence.

14. The system according to claim 8, wherein said first plurality of software applications include an operating system for said first computing unit, further comprising at least one subsystem configured to execute said operating system on said second computing unit in response to a loss of said first computing unit resulting from said catastrophic failure.

15. A computer-readable medium comprising computer-readable instructions for recovering software applications after a catastrophic failure, said computer-readable instructions when executed by a first computing unit and a second computing unit perform the method comprising:
executing a first plurality of software applications on a first computing unit at a first location;
executing a second plurality of software applications on a second computing unit at a second location, wherein the second plurality of software applications are different than the first plurality of software application, said second location remotely located from said first location and said first and second computing units functioning effectively as a single computing unit;
designating said second computing unit for recovery of said first plurality of software applications upon occurrence of said catastrophic failure and a determination that the first computing unit is unresponsive;
dynamically allocating a workload associated with the first computing unit to the second computing unit and at least one other computing unit upon the occurrence of said catastrophic failure, where the at least one other computing unit includes a third plurality of software applications, wherein the second plurality of applications and the third plurality of applications provide a predetermined set of the first plurality of applications; and executing at least one of said first plurality of software applications on said second computing unit in response to a loss of said first computing unit resulting from said catastrophic failure.

16. The computer-readable medium according to claim 15, further comprising instructions that when executed perform the method further comprising:

designating said first computing unit for recovery of said second plurality of software applications upon occurrence of said catastrophic failure; and executing at least one of said second plurality of software applications on said first computing unit in response to a loss of said second computing unit resulting from said catastrophic failure.

17. The computer-readable medium according to claim 15, wherein said first and said second computing units are one or more of mainframe-based computing units and server-based computing units.

18. The computer-readable medium according to claim 15, wherein said first plurality of software applications include critical and non-critical software applications and said at least one of said first plurality of software applications executed by said second computing unit is a critical software application.

19. The computer-readable medium according to claim 15, wherein said at least one of said first plurality of software applications executed by said second computing unit is specified in a predefined list.

20. The computer-readable medium according to claim 15, further comprising instructions that when executed perform the method further comprising executing said at least one of said first plurality of software applications on said second computing unit according to a predetermined sequence.

21. The computer-readable medium according to claim 15, wherein said first plurality of software applications include an operating system for said first computing unit, further comprising instructions that when executed perform the method further comprising executing said operating system on said second computing unit in response to a loss of said first computing unit resulting from said catastrophic failure.

* * * * *